United States Patent
Cody et al.

[11] Patent Number: 5,935,416
[45] Date of Patent: *Aug. 10, 1999

[54] RAFFINATE HYDROCONVERSION PROCESS

[75] Inventors: Ian A. Cody; Douglas R. Boate; William J. Murphy, all of Baton Rouge, La.; Daniel P. Leta, Flemington, N.J.

[73] Assignee: Exxon Research and Engineering Co., Florham Park, N.J.

[*] Notice: This patent is subject to a terminal disclaimer.

[21] Appl. No.: 09/023,438

[22] Filed: Feb. 13, 1998

Related U.S. Application Data

[63] Continuation-in-part of application No. 08/678,382, Jun. 28, 1996.

[51] Int. Cl.[6] .............. C10G 1/04; C10G 11/02; C10G 73/06; C10G 25/00
[52] U.S. Cl. .............. 208/87; 208/119; 208/123; 208/124; 208/302; 208/31; 208/35; 208/37
[58] Field of Search .............. 208/87, 119, 123, 208/124, 302, 31, 35, 37, 18; 585/13, 14

[56] References Cited

U.S. PATENT DOCUMENTS

| | | | |
|---|---|---|---|
| 3,691,067 | 9/1972 | Ashton et al. | 204/264 |
| 3,732,154 | 5/1973 | Mills et al. | 208/87 |
| 3,779,896 | 12/1973 | Woodle | 208/86 |
| 4,211,635 | 7/1980 | Chen | 208/93 |
| 4,229,282 | 10/1980 | Peters et al. | 208/111 |
| 4,383,913 | 5/1983 | Powell et al. | 308/59 |
| 4,437,975 | 3/1984 | Gillespie et al. | 208/87 |
| 4,610,778 | 9/1986 | Graven | 208/89 |
| 4,627,908 | 12/1986 | Miller | 208/58 |
| 4,636,299 | 1/1987 | Unmuth et al. | 208/87 |
| 4,906,350 | 3/1990 | Lucien et al. | 208/197 |
| 4,952,303 | 8/1990 | Bortz et al. | 208/216 |
| 5,013,422 | 5/1991 | Absil et al. | 208/27 |
| 5,122,257 | 6/1992 | Van Helden et al. | 208/49 |
| 5,273,645 | 12/1993 | Clark et al. | 208/87 |
| 5,292,426 | 3/1994 | Holland et al. | 208/111 |
| 5,300,213 | 4/1994 | Bartilucci et al. | 208/87 |
| 5,302,279 | 4/1994 | Degnan et al. | 208/87 |
| 5,393,408 | 2/1995 | Ziemer et al. | 208/57 |

FOREIGN PATENT DOCUMENTS

| | | | |
|---|---|---|---|
| 0 471 524 A1 | 2/1992 | European Pat. Off. | C10G 65/04 |
| 0 649 896 A1 | 4/1995 | European Pat. Off. | C10G 65/12 |

*Primary Examiner*—Mark L. Bell
*Assistant Examiner*—Patricia L. Hailey
*Attorney, Agent, or Firm*—James H. Takemoto

[57] ABSTRACT

A process for producing a high VI/low volatility lubricating oil basestock. The process comprises subjecting the raffinate from a solvent extraction step to a two-step, single-stage hydroconversion process wherein the first step involves severe hydroconversion of the raffinate followed by a cold hydrofinishing step. The effluent from the cold hydrofinishing step is then catalytically dewaxed or in the alternative, solvent dewaxed followed by catalytic dewaxing.

17 Claims, 3 Drawing Sheets

RAFFINATE HYDROCONVERSION PROCESS

CROSS-REFERENCE TO RELATED APPLICATIONS

This is a continuation-in-part of U.S. application Ser. No. 08/678,382 filed Jun. 28, 1996.

FIELD OF THE INVENTION

This invention relates to a process for preparing lubricating oil basestocks having a high saturates content, high viscosity indices and low volatilities.

BACKGROUND OF THE INVENTION

It is well known to produce lubricating oil basestocks by solvent refining. In the conventional process, crude oils are fractionated under atmospheric pressure to produce atmospheric resids, which are further fractionated under vacuum. Select distillate fractions are then optionally deasphalted and solvent extracted to produce a paraffin rich raffinate and an aromatics rich extract. The raffinate is then dewaxed to produce a dewaxed oil which is usually hydrofinished to improve stability and remove color bodies.

Solvent refining is a process, which selectively isolates components of crude oils having desirable properties for lubricant basestocks. Thus the crude oils used for solvent refining are restricted to those, which are highly paraffinic in nature as aromatics tend to have lower viscosity indices (VI), and are therefore less desirable in lubricating oil basestocks. Also, certain types of aromatic compounds can result in unfavorable toxicity characteristics. Solvent refining can produce lubricating oil basestocks have a VI of about 95 in good yields.

Today more severe operating conditions for automobile engines have resulted in demands for basestocks with lower volatilities (while retaining low viscosities) and lower pour points. These improvements can only be achieved with basestocks of more isoparaffinic character, i.e., those with VI's of 105 or greater. Solvent refining alone cannot economically produce basestocks having a VI of 105 with typical crudes. Two alternative approaches have been developed to produce high quality lubricating oil basestocks; (1) wax isomerization and (2) hydrocracking. Both of the methods involve high capital investments and suffer from yield debits. Moreover, hydrocracking eliminates some of the solvency properties of basestocks produced by traditional solvent refining techniques. Also, the typically low quality feedstocks used in hydrocracking, and the consequent severe conditions required to achieve the desired viscometric and volatility properties can result in the formation of undesirable (toxic) species. These species are formed in sufficient concentration that a further processing step such as extraction is needed to achieve a non-toxic base stock.

An article by S. Bull and A. Marmin entitled "Lube Oil Manufacture by Severe Hydrotreatment", Proceedings of the Tenth World Petroleum Congress, Volume 4, Developments in Lubrication, PD 19(2), pages 221–228, describes a process wherein the extraction unit in solvent refining is replaced by a hydrotreater.

U.S. Pat. No. 3,691,067 describes a process for producing a medium and high VI oil by hydrotreating a narrow cut lube feedstock. The hydrotreating step involves a single hydrotreating zone. U.S. Pat. No. 3,732,154 discloses hydrofinishing the extract or raffinate from a solvent extraction process. The feed to the hydrofinishing step is derived from a highly aromatic source such as a naphthenic distillate. U.S. Pat. No. 4,627,908 relates to a process for improving the bulk oxidation stability and storage stability of lube oil basestocks derived from hydrocracked bright stock. The process involves hydrodenitrification of a hydrocracked bright stock followed by hydrofinishing.

U.S. Pat. No. 4,636,299 discloses a process for reducing the pour point of a feedstock containing nitrogen and sulfur-containing compounds wherein the feedstock is solvent extracted with N-methyl-2-pyrrolidone to produce a raffinate, the raffinate is hydrotreated to convert the nitrogen and sulfur containing compounds to ammonia and hydrogen sulfide, stripped of ammonia and hydrogen sulfide and stripped effluent cat dewaxed.

It would be desirable to supplement the conventional solvent refining process so as to produce high VI, low volatility oils which have excellent toxicity, oxidative and thermal stability, solvency, fuel economy and cold start properties without incurring any significant yield debit which process requires much lower investment costs than competing technologies such as hydrocracking.

SUMMARY OF THE INVENTION

This invention relates to a process for producing a lubricating oil basestock by selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing the raffinate feed to a hydroconversion zone and processing the raffinate feed in the presence of a non-acidic hydroconversion catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;

(d) passing the hydroconverted raffinate to a hydrofinishing zone and conducting cold hydrofinishing of the hydroconverted raffinate in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a hydrofinished raffinate;

(e) passing the hydrofinished raffinate to a separation zone to remove products having a boiling less than about 250° C.; and (f) passing the hydrofinished raffinate from step (e) to a dewaxing zone and catalytically dewaxing the hydrofinished raffinate under catalytic dewaxing conditions in the presence of hydrogen and a catalytic dewaxing catalyst comprising a metal hydrogenation component and a crystalline 10 or 12 ring molecular sieve to produce a dewaxed basestock having a viscosity index of at least about 105.

In another embodiment, this invention relates to a process for selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing the raffinate feed to a hydroconversion zone and processing the raffinate feed in the presence of a non-acidic catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;

(d) passing the hydroconverted raffinate to a hydrofinishing reaction zone and conducting cold hydrofinishing of the hydroconverted raffinate in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a hydrofinished raffinate;

(e) solvent dewaxing the hydrofinished raffinate under solvent dewaxing conditions to obtain a solvent dewaxed oil having a pour point less than about 10° C.; and (f) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a dewaxed basestock having a viscosity index of at least 105.

In yet another embodiment, this invention relates to a process for selectively hydroconverting a raffinate produced from solvent refining a lubricating oil feedstock which comprises:

(a) conducting the lubricating oil feedstock to a solvent extraction zone and separating therefrom an aromatics rich extract and a paraffins rich raffinate;

(b) stripping the raffinate of solvent to produce a raffinate feed having a dewaxed oil viscosity index from about 85 to about 105 and a final boiling point of no greater than about 650° C.;

(c) passing the raffinate feed to a hydroconversion zone and processing the raffinate feed in the presence of a non-acidic catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;

(d) solvent dewaxing the hydroconverted raffinate under solvent dewaxing conditions to obtain a solvent dewaxed oil having a pour point less than about 10° C.;

(e) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a catalytically dewaxed oil; and (f) passing the catalytically dewaxed oil to a hydrofinishing reaction zone and conducting cold hydrofinishing of the catalytically dewaxed oil in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a dewaxed basestock having a viscosity index of at least about 105.

The process according to the invention produces in good yields a basestock which has a saturates content of at least 90 wt., a VI increase of at least 10 greater than the VI of the raffinate feed, a NOACK volatility improvement over raffinate feedstock of at least about 3 wt. % at the same viscosity in the range of viscosity from 3.5 to 6.5 cSt viscosity at 100° C. and a residual aromatics content sufficient to impart good solvency properties to the oil. In addition, toxicity tests show that the basestock has excellent toxicological properties and will pass toxicity tests as measured by the FDA(c) or IP 346 tests.

DETAILED DESCRIPTION OF THE INVENTION

Figure 1:
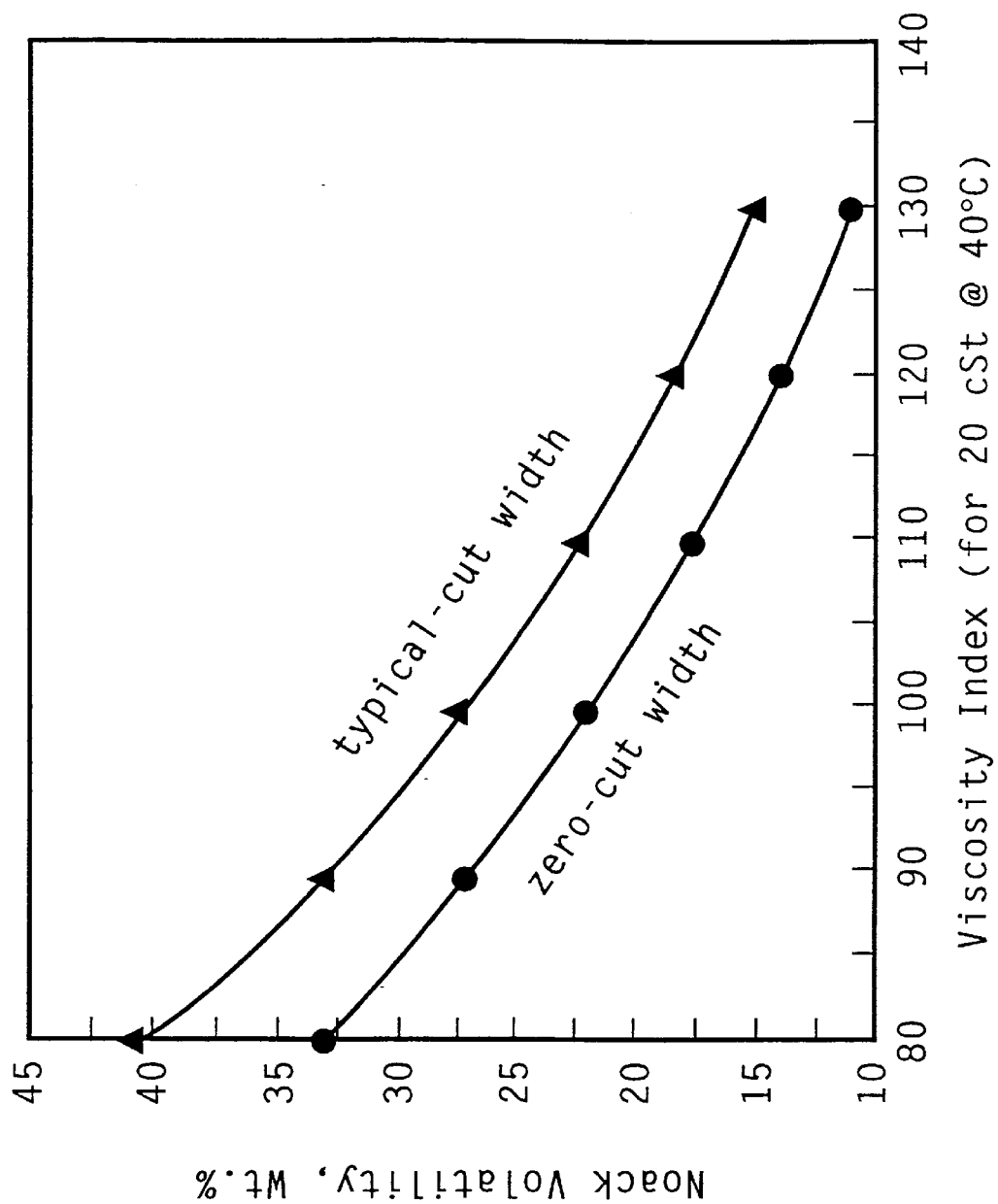
FIG. 1 is a plot of NOACK volatility vs. viscosity index for a 100N basestock.

The solvent refining of select crude oils to produce lubricating oil basestocks typically involves atmospheric distillation, vacuum distillation, extraction, dewaxing and hydrofinishing. Because basestocks having a high isoparaffin content are characterized by having good viscosity index (VI) properties and suitable low temperature properties, the crude oils used in the solvent refining process are typically paraffinic crudes. One method of classifying lubricating oil basestocks is that used by the American Petroleum Institute (API). API Group II basestocks have a saturates content of 90 wt. or greater, a sulfur content of not more than 0.03 wt. and a VI greater than 80 but less than 120. API Group III basestocks are the same as Group II basestocks except that the VI is at least 120.

Generally, the high boiling petroleum fractions from atmospheric distillation are sent to a vacuum distillation unit, and the distillation fractions from this unit are solvent extracted. The residue from vacuum distillation which may be deasphalted is sent to other processing. Other feeds to solvent extraction include waxy streams such as dewaxed oils and foots oils.

The solvent extraction process selectively dissolves the aromatic components in an extract phase while leaving the more paraffinic components in a raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting feed to be extracted with solvent, one can control the degree of separation between the extract and raffinate phases.

In recent years, solvent extraction has been replaced by hydrocracking as a means for producing high VI basestocks in some refineries. The hydrocracking process utilizes low quality feeds such as feed distillate from the vacuum distillation unit or other refinery streams such as vacuum gas oils and coker gas oils. The catalysts used in hydrocracking are typically sulfides of Ni, Mo, Co and W on an acidic support such as silica/alumina or alumina containing an acidic promoter such as fluorine. Some hydrocracking catalysts also contain highly acidic zeolites. The hydrocracking process may involve heteroatom removal, aromatic ring saturation, dealkylation of aromatics rings, ring opening, straight chain and side-chain cracking, and wax isomerization depending on operating conditions. In view of these reactions, separation of the aromatics rich phase that occurs in solvent extraction is an unnecessary step since hydrocracking reduces aromatics content to very low levels.

By way of contrast, the process of the present invention utilizes a two step hydroconversion of the raffinate from the solvent extraction unit under conditions which minimizes hydrocracking and passes waxy components through the hydroconversion process without wax isomerization hydroisomerization while maintaining residual aromatics content at a level sufficient to provide good solvency properties to the basestock. Such amounts of residual aromatics are between about 2 and 10 vol. %. The aromatics content is measured by a high performance liquid chromatography method which quantitates hydrocarbon mixtures into saturate and aromatic content between 1 and 99 wt. %.

The raffinate from the solvent extraction is preferably under-extracted, i.e., the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. The raffinate from the solvent extraction unit is stripped of solvent and then sent to a first hydroconversion unit containing a hydroconversion catalyst. This raffinate feed has a viscosity index of from about 85 to about 105, a boiling range not to exceed about 650° C., preferably less than 600° C., as determined by ASTM 2887 and a viscosity of from 3 to 10 cSt at 100° C.

Hydroconversion catalysts are those containing Group VIB metals (based on the Periodic Table published by Fisher Scientific), and non-noble Group VIII metals, i.e., iron, cobalt and nickel and mixtures thereof. These metals or mixtures of metals are typically present as oxides or sulfides on refractory metal oxide supports.

It is important that the metal oxide support be non-acidic so as to control cracking. A useful scale of acidity for catalysts is based on the isomerization of 2-methyl-2-pentene as described by Kramer and McVicker, J. Catalysis, 92, 355(1985). In this scale of acidity, 2-methyl-2-pentene is subjected to the catalyst to be evaluated at a fixed temperature, typically 200° C. In the presence of catalyst sites, 2-methyl-2-pentene forms a carbenium ion. The isomerization pathway of the carbenium ion is indicative of the acidity of active sites in the catalyst. Thus weakly acidic sites form 4-methyl-2-pentene whereas strongly acidic sites result in a skeletal rearrangement to 3-methyl-2-pentene with very strongly acid sites forming 2,3-dimethyl-2-butene. The mole ratio of 3-methyl-2-pentene to 4-methyl-2-pentene can be correlated to a scale of acidity. This acidity scale ranges from 0.0 to 4.0. Very weakly acidic sites will have values near 0.0 whereas very strongly acidic sites will have values approaching 4.0. The catalysts useful in the present process have acidity values of less than about 0.5, preferably less than about 0.3. The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

Suitable metal oxide supports include low acidic oxides such as silica, alumina or titania, preferably alumina. Preferred aluminas are porous aluminas such as gamma or eta having average pore sizes from 50 to 200 Å, preferably 75 to 150 Å, a surface area from 100 to 300 $m^2/g$, preferably 150 to 250 $m^2/g$ and a pore volume of from 0.25 to 1.0 $cm^3/g$, preferably 0.35 to 0.8 $cm^3/g$. The supports are preferably not promoted with a halogen such as fluorine as this generally increases the acidity of the support.

Preferred metal catalysts include cobalt/molybdenum (1–5% Co as oxide, 10–25% Mo as oxide) nickel/molybdenum (1–5% Ni as oxide, 10–25% Co as oxide) or nickel/tungsten (1–5% Ni as oxide, 10–30% W as oxide) on alumina. Especially preferred are nickel/molybdenum catalysts such as KF-840.

Hydroconversion conditions in the first hydroconversion unit include a temperature of from 340 to 420° C., preferably 360 to 390° C., a hydrogen partial pressure of 800 to 2000 psig (5.5 to 13.8 MPa), preferably 800 to 1800 psig (5.5 to 12.5 MPa), a space velocity of from 0.2 to 3.0 LHSV, preferably 0.3 to 1.0 LHSV and a hydrogen to feed ratio of from 500 to 5000 Scf/B (89 to 890 $m^3/m^3$), preferably 2000 to 4000 Scf/B (356 to 712 $m^3/m^3$).

The hydroconverted raffinate from the first reactor is then conducted to a second reactor where it is subjected to a cold (mild) hydrofinishing step. The catalyst in this second reactor may be the same as those described above for the first reactor. However, more acidic catalyst supports such as silica-alumina, zirconia and the like may be used in the second reactor.

Conditions in the second reactor include temperatures of from 200 to 330° C., preferably 230 to 300° C., a hydrogen partial pressure of from 800 to 2000 psig (5.5 to 13.8 MPa), preferably 800 to 1800 psig (5.5 to 12.5 MPa), a space velocity of from 1 to 5 LHSV, preferably 1 to 3 LHSV and a hydrogen to feed ratio of from 500 to 5000 Scf/B (89 to 890 $m^3/m^3$), preferably 2000 to 4000 Scf/B (356 to 712 $m^3/m^3$).

In order to prepare a finished basestock, the hydroconverted raffinate from the second (cold hydrofinishing) reactor is conducted to a separator e.g., a vacuum stripper (or fractionator) to separate out (strip) low boiling products if the separator is followed by a catalytic dewaxing step. Such products may include hydrogen sulfide and ammonia formed in the first reactor. If desired, a stripper may be situated between the first and second reactors, but this is not essential to produce basestocks according to the invention.

The catalysts useful in the catalytic dewaxing step include crystalline 10 and 12 ring molecular sieves and a metal hydrogenation component. Crystalline molecular sieves include alumino silicates and aluminum phosphates. Examples of crystalline alumino silicates include zeolites such as ZSM-5, ZSM-11, ZSM-12, theta-1 (ZSM-22), ZSM-23, ZSM-35, ZSM-38, ferrierite, ZSM-48, ZSM-57, beta, mordenite and offretite. Examples of crystalline aluminum phosphates include SAPO-11, SAPO-41, SAPO-31, MAPO-11 and MAPO-31. Preferred molecular sieves include theta-1, ZSM-5, ZSM-23, ferrierite and SAPO-11.

The dewaxing catalyst may also contain an amorphous component. The acidity of the amorphous component is preferably from 0.3 to 2.5, preferably 0.5 to 2.0 on the Kramer/McVicker acidity scale described above. Examples of amorphous materials include silica-alumina, halogenated alumina, acidic clays, silica-magnesia, yttria silica-alumina and the like. Especially preferred is silica-alumina.

If the dewaxing catalyst contains an amorphous component, the crystalline molecular sieve/metal hydrogenation component/amorphous component may be composited together. The hydrogenation metal can be deposited on each component separately or can be deposited on the composited catalyst. In the alternative, the crystalline molecular sieve and amorphous component can be in a layered configuration. Preferably, the top layer in the reaction vessel is the amorphous component and the lower layer is the crystalline molecular sieve, although the configuration can be reversed with the top layer as the molecular sieve and the bottom layer as the amorphous component. In the layered configuration, the hydrogenation metal should be deposited on both the molecular sieve and the amorphous component.

The metal hydrogenation component of the dewaxing catalyst may be at least one metal from the Group IB, Group VIB and Group VIII of the Periodic Table (published by Sargent-Welch Scientific Company). Preferred metals are Group VIII noble metals, especially palladium and platinum.

The dewaxing catalyst may contain, based on the weight of total catalyst, from 5 to 95 wt. % of crystalline molecular sieve, from 0 to 90 wt. % of amorphous component and from 0.1 to 30 wt. % of metal hydrogenation component with the balance being matrix material.

The dewaxing catalyst may also include a matrix or binder which is a material resistant to process conditions and which is substantially non-catalytic under reaction conditions. Matrix materials may be synthetic or naturally occurring materials such as clays, silica and metal oxides. Matrix materials which are metal oxides include single oxides such as alumina, binary compositions such as silica-magnesia and ternary compositions such as silica-alumina-zirconia.

Process conditions in the catalytic dewaxing zone include a temperature of from 240 to 420° C., preferably 270 to 400° C., a hydrogen partial pressure of from 3.45 to 34.5 mPa (500 to 5000 psi), preferably 5.52 to 20.7 mPa, a liquid hourly space velocity of from 0.1 to 10 v/v/hr, preferably 0.5 to 3.0, and a hydrogen circulation rate of from 89 to 1780 $m^3/m^3$ (500 to 10000 scf/B), preferably 178 to 890 $m^3/m^3$.

In an alternative embodiment, the hydroconverted raffinate from the cold hydrofinishing unit or the hydroconverted raffinate from the hydroconversion zone may be conducted to a solvent dewaxer with or without, preferably with a stripping step to remove low boiling products. The solvent dewaxing process typically involves mixing feed with solvent at atmospheric pressure, separating precipitated wax and recovering solvent for recycling. The hydroconverted raffinate is mixed with chilled solvent to form an oil-solvent solution and precipitated wax is thereafter separated by, for example filtration. The temperature and solvent are selected so that the oil is dissolved by the chilled solvent while the wax is precipitated. The solvent dewaxer may then be followed by a catalytic dewaxing step such as described above. Because solvent dewaxing typically occurs at atmospheric pressure, it may be necessary to pressurize the solvent dewaxed oil prior to the catalytic dewaxing step.

A particularly suitable solvent dewaxing process involves the use of a cooling tower where solvent is prechilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F./minute, usually between about 1 to about 5° F./minute. The final temperature of the oil-solvent/precipitated wax mixture in the cooling tower will usually be between 0 and 50° F. (−17.8 to 10° C.). The mixture may then be sent to a scraped surface chiller to separate precipitated wax from the mixture.

In general, the amount of solvent added will be sufficient to provide a liquid/solid weight ratio between the range of 5/1 and 20/1 at the dewaxing temperature and a solvent/oil volume ratio between 1.5/1 to 5/1. The solvent dewaxed oil is typically dewaxed to a pour point from +10° C. to −20° C.

Representative dewaxing solvents are aliphatic ketones having 3–6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene. Further descriptions of solvent dewaxing process useful herein are disclosed in U.S. Pat. Nos. 3,773,650 and 3,775,288 which are incorporated herein in their entirety.

The solvent dewaxed oil may be suitable as a lubricating oil basestock. However in the present embodiment, the solvent dewaxed oil is subjected to a catalytic dewaxing step to further lower the pour point using the catalytic dewaxing catalysts described above. As noted previously, the dewaxing catalyst may comprise a molecular sieve loaded with a metal hydrogenation component, may be a composite of a metal loaded combination of crystalline molecular sieve and amorphous component or may be a layered configuration wherein the layers contain an amorphous component, a crystalline molecular sieve and a metal hydrogenation component.

In either processing sequence, i.e., hydroconversion—cold hydrofinishing—catalytic dewaxing, or hydroconversion—cold hydrofinishing—solvent dewaxing—catalytic dewaxing, the final catalytic dewaxing step may be followed by a second cold hydrofinishing step under the cold hydrofinishing conditions described above. This second cold hydrofinishing step would be used in those instances where needed to meet product quality requirements such as color or light stability.

Alternatively, the processing sequences may omit the first cold hydrofinishing step and use only a final cold hydrofinishing step. These sequences are defined as hydroconversion—catalytic dewaxing—cold hydrofinishing, or hydroconversion—solvent dewaxing—catalytic dewaxing—cold hydrofinishing.

The lubricating oil basestock produced by the process according to the invention is characterized by the following properties: viscosity index of at least about 105, preferably at least 107, NOACK volatility improvement (as measured by DIN 51581) over raffinate feedstock of at least about 3 wt., preferably at least about 5 wt., at the same viscosity within the range 3.5 to 6.5 cSt viscosity at 100° C., pour point of −15° C. or lower, and a low toxicity as determined by IP346 or phase 1 of FDA (c). IP346 is a measure of polycyclic aromatic compounds. Many of these compounds are carcinogens or suspected carcinogens, especially those with so-called bay regions [see Accounts Chem. Res. 17, 332(1984) for further details]. The present process reduces these polycyclic aromatic compounds to such levels as to pass carcinogenicity tests even though the total aromatics content of the lubricating oil may be up to 10 wt., based on lubricant basestock. The FDA (c) test is set forth in 21 CFR 178.3620 and is based on ultraviolet absorbances in the 300 to 359 nm range.

As can be seen from FIG. 1, NOACK volatility is related to VI for any given basestock. The relationship shown in FIG. 1 is for a light basestock (about 100N). If the goal is to meet a 22 wt. % NOACK for a 100N oil, then the oil should have a VI of about 110 for a product with typical-cut width, e.g., 5 to 50% off by GCD at 60° C. Volatility improvements can be achieved with lower VI product by decreasing the cut width. In the limit set by zero cut width, one can meet 22% NOACK at a VI of about 100. However, this approach, using distillation alone, incurs significant yield debits.

Hydrocracking is also capable of producing high VI, and consequently low NOACK basestocks, but is less selective (lower yields) than the process of the invention. Furthermore both hydrocracking and processes such as wax isomerization destroy most of the molecular species responsible for the solvency properties of solvent refined oils. The latter also uses wax as a feedstock whereas the present process is designed to preserve wax as a product and does little, if any, wax conversion.

Figure 2:
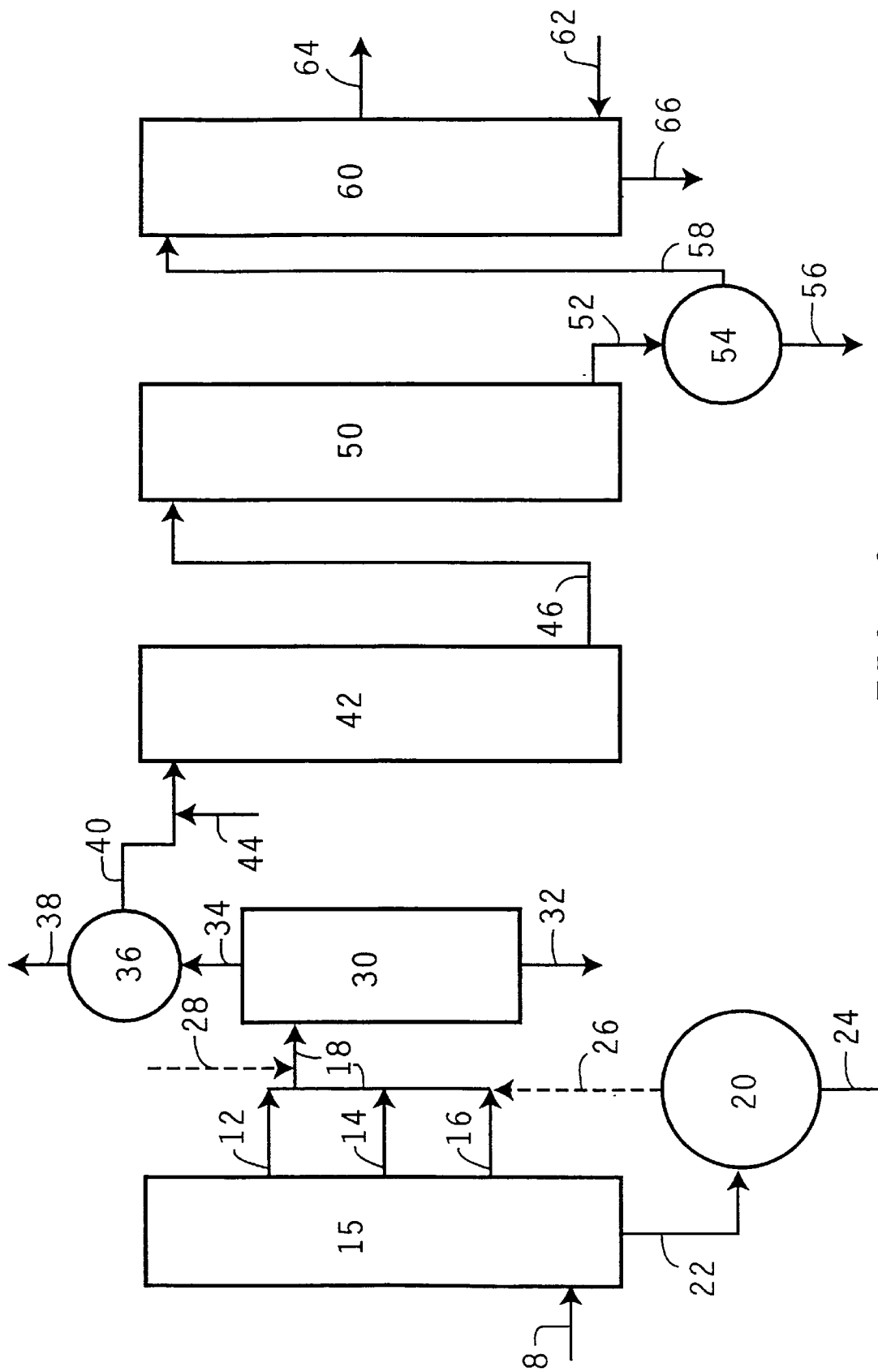
FIG. 2 is a simplified schematic flow diagram of the raffinate hydroconversion process.

The process of the invention is further illustrated by FIG. 2. The feed 8 to vacuum pipestill 10 is typically an atmospheric reduced crude from an atmospheric pipestill (not shown). Various distillate cuts shown as 12 (light), 14 (medium) and 16 (heavy) may be sent to solvent extraction unit 30 via line 18. These distillate cuts may range from about 200° C. to about 650° C. The bottoms from vacuum pipestill 10 may be sent through line 22 to a coker, a visbreaker or a deasphalting extraction unit 20 where the bottoms are contacted with a deasphalting solvent such as propane, butane or pentane. The deasphalted oil may be combined with distillate from the vacuum pipestill 10 through line 26 provided that the deasphalted oil has a boiling point no greater than about 650° C. or is preferably sent on for further processing through line 24. The bottoms from deasphalter 20 can be sent to a visbreaker or used for asphalt production. Other refinery streams may also be added to the feed to the extraction unit through line 28 provided they meet the feedstock criteria described previously for raffinate feedstock.

In extraction unit 30, the distillate cuts are solvent extracted with N-methyl pyrrolidone and the extraction unit is preferably operated in countercurrent mode. The solvent-to-oil ratio, extraction temperature and percent water in the solvent are used to control the degree of extraction, i.e., separation into a paraffins rich raffinate and an aromatics rich extract. The present process permits the extraction unit to operate to an "under extraction" mode, i.e., a greater amount of aromatics in the paraffins rich raffinate phase. The aromatics rich extract phase is sent for further processing through line 32. The raffinate phase is conducted through line 34 to solvent stripping unit 36. Stripped solvent is sent through line 38 for recycling and stripped raffinate is conducted through line 40 to first hydroconversion unit 42.

The first hydroconversion unit 42 contains KF-840 catalyst which is nickel/molybdenum on an alumina support and available from Akzo Nobel. Hydrogen is admitted to unit or reactor 42 through line 44. Unit conditions are typically temperatures of from 340–420° C., hydrogen partial pressures from 800 to 2000 psig, space velocity of from 0.5 to 3.0 LHSV and a hydrogen to feed ratio of from 500 to 5000 Scf/B. Gas chromatographic comparisons of the hydroconverted raffinate indicate that almost no wax isomerization is taking place. While not wishing to be bound to any particular theory since the precise mechanism for the VI increase which occurs in this stage is not known with certainty, it is known that heteroatoms are being removed, aromatic rings are being saturated and naphthene rings, particularly multi-ring naphthenes, are selectively eliminated.

Hydroconverted raffinate from unit 42 is sent through line 46 to cold hydrofinishing unit or reactor 50. Reaction conditions in unit are mild and include a temperature of from 200–320° C., a hydrogen partial pressure of from 800 to 2000 psig, a space velocity of 1 to 5 LHSV and a hydrogen feed rate of from 500 to 5000 Scf/B. This mild or cold hydrofinishing step further reduces toxicity to very low levels.

Hydrofinished raffinate is then conducted through line 52 to separator 54. Light liquid products and gases are separated and removed through line 56. The remaining hydrofinished raffinate is conducted through line 58 to dewaxing unit 60. Dewaxing may occur by the use of solvents (introduced through line 62) which may be followed by cooling, by catalytic dewaxing or by a combination thereof. If dewaxing unit 60 utilizes solvent dewaxing, then hydrofinished raffinate may be conducted directly from reactor 50 to dewaxing unit 60 without going through separator 54. The solvent dewaxed oil from unit 60 may then be sent to a second dewaxing unit (not shown) wherein catalytic dewaxing of the solvent dewaxed oil occurs. If dewaxing unit 60 utilizes catalytic dewaxing, then the hydrofinished raffinate from reactor 50 should go through separator 54 before being conducted to dewaxing unit 60. Catalytic dewaxing involves selective hydrocracking with or without hydroisomerization as a means to create low pour point lubricant basestocks. Solvent dewaxing with optional cooling separates waxy molecules from the hydroconverted lubricant basestock thereby lowering the pour point. Hydroconverted raffinate is preferably contacted with methyl isobutyl ketone followed by the DILCHILL Dewaxing Process developed by Exxon. This method is well known in the art. Finished lubricant basestock is removed through line 64 and waxy product through line 66.

In the process according to the invention, any waxy components in the feed to extraction unit 30 passes virtually unchanged through the hydroconversion zone and is conducted to dewaxing unit 60 where it may be recovered as product.

The invention is further illustrated by the following non-limiting examples.

EXAMPLE 1

Thermal diffusion is a technique that can be used for separating hydrocarbon mixtures into molecular types. Although it has been studied and used for over 100 years, no really satisfactory theoretical explanation for the mechanism of thermal diffusion exists. The technique is described in the following literature:

A. L. Jones and E. C. Milberger., Industrial and Engineering Chemistry, p. 2689, December 1953.

T. A. Warhall and F. W. Melpolder., Industrial and Engineering Chemistry, p. 26, January 1962.

and

H. A. Harner and M. M. Bellamy., American Laboratory, p. 41, January 1972.

and references therein.

The thermal diffusion apparatus used in the current application was a batch unit constructed of two concentric stainless steel tubes with an annular spacing between the inner and outer tubes of 0.012 in. The length of the tubes was approximate 6 ft. The sample to be tested is placed in the annular space between the inner and outer concentric tubes. The inner tube had an approximate outer diameter of 0.5 in. Application of this method requires that the inner and outer tubes be maintained at different temperatures. Generally temperatures of 100 to 200° C. for the outer wall and about 65° C. for the inner wall are suitable for most lubricating oil samples. The temperatures are maintained for periods of 3 to 14 days.

While not wishing to be bound to any particular theory, the thermal diffusion technique utilizes diffusion and natural convention which arises from the temperature gradient established between the inner and outer walls of the concentric tubes. Higher VI molecules diffuse to the hotter wall and rise. Lower VI molecules diffuse to the cooler inner walls and sink. Thus a concentration gradient of different molecular densities (or shapes) is established over a period of days. In order to sample the concentration gradient, sampling ports are approximately equidistantly spaced between the top and bottom of the concentric tubes. Ten is a convenient number of sampling ports.

Two samples of oil basestocks were analyzed by thermal diffusion techniques. The first is a conventional 150N basestock having a 102 VI and prepared by solvent extraction/ dewaxing methods. The second is a 112 VI basestock prepared by the raffinate hydroconversion (RHC) process according to the invention from a 100 VI, 250N raffinate. The samples were allowed to sit for 7 days after which samples were removed from sampling ports 1–10 spaced from top to bottom of the thermal diffusion apparatus.

Figure 3:
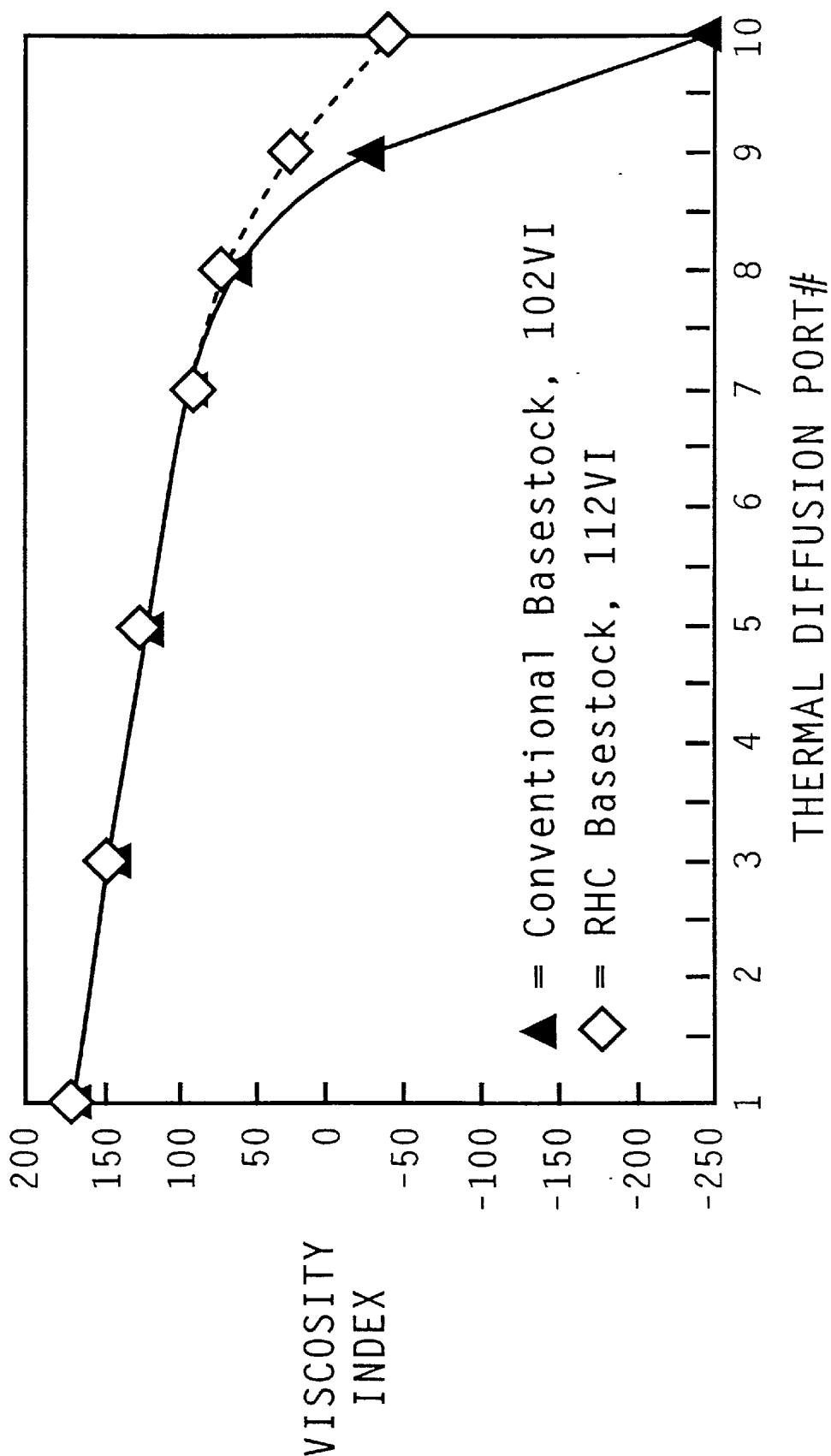
FIG. 3 is a plot of the thermal diffusion separation vs. viscosity index.

The results are shown in FIG. 3. FIG. 3 demonstrates that even a "good" conventional basestock having a 102 VI contains some very undesirable molecules from the standpoint of VI. Thus sampling ports 9 and especially 10 yield molecular fractions containing very low VI's. These fractions which have VI's in the −25 to −250 range likely contain multi-ring naphthenes. In contrast, the RHC product according to the invention contains far fewer multi-ring naphthenes as evidenced by the VI's for products obtained from sampling ports 9 and 10. Thus the present RHC process selectively destroys multi-ring naphthenes and multi-ring aromatics from the feed without affecting the bulk of the other higher quality molecular species. The efficient removal of the undesirable species as typified by port 10 is at least partially responsible for the improvement in NOACK volatility at a given viscosity.

EXAMPLE 2

This Example compares a low acidity catalyst useful in the process according to the invention versus a more acidic catalyst. The low acidity catalyst is KF-840 which is commercially available from Akzo Nobel and has an acidity of 0.05. The other catalyst is a more acidic, commercially available catalyst useful in hydrocracking processes having an estimated acidity of 1 and identified as Catalyst A. The feed is a 250N waxy raffinate having an initial boiling point of 335° C., a mid-boiling point of 463° C. and a final boiling point of 576° C., a dewaxed oil viscosity at 100° C. of 8.13, a dewaxed oil VI of 92 and a pour point of −19° C. The results are shown in Tables 1 and 2.

TABLE 1

Comparison at Similar Conditions

| | Catalyst | |
| --- | --- | --- |
| Operating Conditions | Catalyst A | KF-840 |
| Temperature, ° C. | 355 | 360 |
| LHSV, v/v/hr | 0.5 | 0.5 |
| H$_2$ pressure psig | 800 | 800 |
| H$_2$ to feed Scf/B | 1600 | 1300 |
| Conversion to 370° C.−, wt. | 22 | 11 |
| Product VI | 114 | 116 |

TABLE 2

Comparison at Similar Conditions

| | Catalyst | |
| --- | --- | --- |
| Operating Conditions | Catalyst A | KF-840 |
| Temperature | 345 | 360 |
| LHSV, v/v/hr | 0.5 | 0.5 |
| H$_2$ pressure psig | 800 | 800 |
| H$_2$ to feed Scf/B | 1600 | 1300 |
| Conversion to 370° C.−, wt. | 11 | 11 |
| Product VI | 107 | 116 |

As can be seen from Table 1, if reaction conditions are similar, then Catalyst A gives a much higher conversion. If conversion is held constant (by adjusting reaction conditions), then the VI of the product from Catalyst A is much lower. These results show that while more acidic catalysts have higher activity, they have much lower selectivity for VI improvement.

EXAMPLE 3

This example shows that processes like lubes hydrocracking which typically involve a more acid catalyst in the second of two reactors is not the most effective way to improve volatility properties. The results for a 250N raffinate feed having a 100 VI DWO is shown in Table 3. Product was topped to the viscosity required and then dewaxed.

TABLE 3

| 2 Reactor 2 Catalyst* Two Stage Process | | | | | |
| --- | --- | --- | --- | --- | --- |
| | Viscosity, | | | Raffinate Hydroconversion** | |
| Yield | cSt @ 100° C. | NOACK*** Volatility, wt. | Yield | Viscosity, cSt @ 100° C. | NOACK Volatility |
| 30.5 | 6.500 | 3.3 | 69.7 | 6.500 | 3.6 |

*1st stage conditions: Ni/Mo catalyst, 360° C., 800 psig H$_2$, 0.5 LHSV, 1200 Scf/B
**2nd stage conditions: Ni/Mo/Silica alumina catalyst, 366° C., 2000 psig H$_2$, 1.0 LHSV, 2500 Scf/B
**Conditions: KF-840 catalyst, 353° C., 800 psig H$_2$, 0.49 LHSV, 1200 Scf/B
***Estimated by GCD With an acid silica-alumina type catalyst in the second reactor of the 2 reactor process, the yield of product of a given volatility at the same viscosity is lower than the yield of the process of the invention using raffinate feeds. This confirms that a low acidity catalyst is required to achieve low volatility selectively.

EXAMPLE 4

Many current commercially available basestocks will have difficulty meeting future engine oil volatility requirements. This examples demonstrates that conventional extraction techniques vs. hydroconversion techniques suffer from large yield debits in order to decrease NOACK volatility. NOACK volatility was estimated using gas chromatographic distillation (GCD) set forth in ASTM 2887. GCD NOACK values can be correlated with absolute NOACK values measured by other methods such as DIN 51581.

The volatility behavior of conventional basestocks is illustrated using an over-extracted waxy raffinate 100N sample having a GCD NOACK volatility of 27.8 (at 3.816 cSt viscosity at 100° C.). The NOACK volatility can be improved by removing the low boiling front end (Topping) but this increases the viscosity of the material. Another alternative to improving NOACK volatility is by removing material at both the high boiling and low boiling ends of the feed to maintain a constant viscosity (Heart-cut). Both of these options have limits to the NOACK volatility which can be achieved at a given viscosity and they also have significant yield debits associated with them as outlined in the following table;

TABLE 4

Distillation Assay of 100 N
Over-Extracted Waxy Raffinate (103 VI DWO*)

| Processing | NOACK Volatility, wt.** | Yield, % | Viscosity, cSt @ 100° C. |
|---|---|---|---|
| None | 27.8 | 100 | 3.816 |
| Topping | 26.2 | 95.2 | 3.900 |
| Heart-cut | 22.7 | 58.0 | 3.900 |
| Heart-cut | 22.4 | 50.8 | 3.900 |
| Heart-cut | 21.7 | 38.0 | 3.900 |

*DWO = dewaxed oil
**estimated by GCD

EXAMPLE 5

The over-extracted feed from Example 4 was subjected to raffinate hydroconversion under the following conditions: KF-840 catalyst at 353° C., 800 psig $H_2$, 0.5 LHSV, 1200 Scf/B. Raffinate hydroconversion under these conditions increased the DWO VI to 111. The results are given in Table 5.

TABLE 5

Distillation Assay of Hydroconverted Waxy
Raffinate (103 VI to 111 VI DWO)

| Processing | NOACK* Volatility | Yield, % | Viscosity, cSt @ 100° C. |
|---|---|---|---|
| None | 38.5 | 99.9 | — |
| Topping | 21.1 | 76.2 | 3.900 |
| Heart-cut | 20.9 | 73.8 | 3.900 |
| Heart-cut | 19.9 | 62.8 | 3.900 |
| Heart-cut | 19.2 | 52.2 | 3.900 |
| Heart-cut | 18.7 | 39.6 | 3.900 |

*Estimated by GCD

These results demonstrate that raffinate hydroconversion can achieve lower NOACK volatility much more selectivity than by distillation alone, e.g., more than double the yield at 21 NOACK. Furthermore, since the process of the invention removes poorer molecules, much lower volatilities can be achieved than by distillation alone.

EXAMPLE 6

This example illustrates the preferred feeds for the raffinate hydroconversion (RHC) process. The results given in Table 6 demonstrate that there is an overall yield credit associated with lower VI raffinates to achieve the same product quality (110 VI) after topping and dewaxing. The table illustrates the yields achieved across RHC using 100N raffinate feed.

TABLE 6

| Feed VI | NOACK Volatility | Viscosity cSt @ 100° C. | Extraction Yield | Hydro-processing Yield | Yield of Waxy Product (on distillate) |
|---|---|---|---|---|---|
| 103* | 21.1 | 3.900 | 53.7 | 76.2 | 40.9 |
| 92** | 21.1 | 4.034 | 73.9 | 63.8 | 47.1 |

*KF-840 catalyst, 353° C., 800 psig $H_2$, 0.5 LHSV, 1200 Scf/B
**KF-840 catalyst, 363–366° C., 1200 psig $H_2$, 0.7 LHSV, 2400 Scf/B The yield to get to a 110 VI product directly from distillate by extraction alone is only 39.1% which further illustrates the need to combine extraction with hydroprocessing.

While under-extracted feeds produce higher yields in RHC, use of distillates as feeds is not preferred since very severe conditions (high temperature and low LHSV) are required. For example, for a 250N distillate over KF-840 at 385° C., 0.26 LHSV, 1200 psi $H_2$, and 2000 Scf/B gas rate, only 104 VI product was produced.

Also, combinations of distillate hydroprocessing (to reach an intermediate VI) then extraction to achieve target VI is not preferred. This is because the extraction process is nonselective for removal of naphthenes created from aromatics in the distillate hydroprocessing stage.

EXAMPLE 7

In the raffinate hydroconversion process according to the invention, the first reaction zone is followed by a second cold hydrofining (CHF) zone. The purpose of CHF is to reduce the concentration of molecular species which contribute to toxicity. Such species may include 4- and 5-ring polynuclear aromatic compounds, e.g., pyrenes which either pass through or are created in the first reaction zone. One of the tests used as an indicator of potential toxicity is the FDA "C" test (21 CFR 178.3620) which is based on absorbances in the ultraviolet (UV) range of the spectrum. The following table demonstrates that CHF produces a product with excellent toxicological properties which are much lower than the acceptable maximum values.

TABLE 7

| | FDA "C" | | | |
|---|---|---|---|---|
| | 280–289 nm | 290–299 nm | 300–359 nm | 360–400 nm |
| FDA "C" MAX (Absorbance Units) Sample | 0.7 | 0.6 | 0.4 | 0.09 |
| CHF Products | | | | |
| DLM-120 (CHF Process Conditions: 3 v/v/h, 260° C., 800 psig, 1200 Scf/B Hydrogen (containing N = 38 wppm, S = 0.6 wt. % on feed)) | 0.42 | 0.25 | 0.22 | 0.024 |
| DLM-118 (CHF Process Conditions: 3 v/v/h, 260° C., 800 psig, 1200 Scf/B Hydrogen) CHF Products | 0.26 | 0.14 | 0.11 | 0.013 |
| DLM-115 (CHF Process Conditions: 2 v/v/h, 260° C., 800 psig, 1200 Scf/B) | 0.36 | 0.23 | 0.17 | 0.016 |

These results demonstrate that a CHF step enables the product to easily pass the FDA "C" test.

EXAMPLE 8

Example 8 shows that products from RHC have outstanding toxicological properties versus basestocks made either by conventional solvent processing or hydrocracking. Besides FDA "C", IP 346 and modified Ames (mutagenicity index) are industry wide measures of toxicity. The results are shown in Table 8.

TABLE 8

| | Commercial Solvent Extracted Basestock | | Commercial Hydrocracked Basestock | RHC Basestock | |
|---|---|---|---|---|---|
| | 100 N | 250 N | 100 N | 100 N | 250 N |
| IP346, wt. % | 0.55 | 0.55 | 0.67 | 0.11 | 0.15 |
| Mod Ames, MI | 0.0 | 0.0 | 0.0 | 0.0 | 0.0 |
| FDA (C) (phase I) (300–359 nm) | 0.22 | 0.22 | 0.21 | 0.02 | 0.03 |

The results in Table 8 demonstrate that RHC produces a basestock with much improved toxicological properties over conventional solvent extracted or hydrocracked basestocks.

What is claimed is:

1. A process for producing a lubricating oil basestock by selectively hydroconverting a raffinate produced from solvent refining a lubricating oil feedstock which comprises:
   (a) conducting the lubricating oil feedstock to a solvent extraction zone and under-extracting the feedstock to form an under-extracted raffinate whereby the yield of raffinate is maximized;
   (b) stripping the under-extracted raffinate of solvent to produce an under-extracted raffinate feed having a dewaxed oil viscosity index from about 85 to about 105 and a final boiling point of no greater than about 650° C.;
   (c) passing the raffinate feed to a hydroconversion zone and processing the raffinate feed in the presence of a non-acidic hydroconversion catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;
   (d) passing the hydroconverted raffinate to a hydrofinishing zone and conducting cold hydrofinishing of the hydroconverted raffinate in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a hydrofinished raffinate;
   (e) passing the hydrofinished raffinate to a separation zone to remove products having a boiling less than about 250° C.; and
   (f) passing the hydrofinished raffinate from step (e) to a dewaxing zone and catalytically dewaxing the hydrofinished raffinate under catalytic dewaxing conditions in the presence of hydrogen and a catalytic dewaxing catalyst comprising a metal hydrogenation component and a crystalline 10 or 12 ring molecular sieve to produce a dewaxed basestock having a viscosity index of at least about 105.

2. A process for producing a lubricating oil basestock by selectively hydroconverting a raffinate produced from solvent refining a lubricating oil feedstock which comprises:
   (a) conducting the lubricating oil feedstock to a solvent extraction zone and under-extracting the feedstock to form an under-extracted raffinate whereby the yield of raffinate is maximized;
   (b) stripping the under-extracted raffinate of solvent to produce an under-extracted raffinate feed having a dewaxed oil viscosity index from about 85 to about 105 and a final boiling point of no greater than about 650° C.;
   (c) passing the raffinate feed to a hydroconversion zone and processing the raffinate feed in the presence of a non-acidic hydroconversion catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;
   (d) passing the hydroconverted raffinate to a hydrofinishing reaction zone and conducting cold hydrofinishing of the hydroconverted raffinate in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a hydrofinished raffinate;
   (e) solvent dewaxing the hydrofinished raffinate under solvent dewaxing conditions to obtain a solvent dewaxed oil having a pour point less than about 10° C.; and
   (f) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a dewaxed basestock having a viscosity index of at least about 105.

3. A process for producing a lubricating oil basestock by selectively hydroconverting a raffinate produced from solvent refining a lubricating oil feedstock which comprises:
   (a) conducting the lubricating oil feedstock to a solvent extraction zone and under-extracting the feedstock to form an under-extracted raffinate whereby the yield of raffinate is maximized;
   (b) stripping the under-extracted raffinate of solvent to produce an under-extracted raffinate feed having a dewaxed oil viscosity index from about 85 to about 105 and a final boiling point of no greater than about 650° C.;
   (c) passing the raffinate feed to a hydroconversion zone and processing the raffinate feed in the presence of a non-acidic catalyst at a temperature of from 340 to 420° C., a hydrogen partial pressure of from 800 to 2000 psig, space velocity of 0.2 to 3.0 LHSV and a hydrogen to feed ratio of from 500 to 5000 Scf/B to produce a hydroconverted raffinate;
   (d) solvent dewaxing the hydroconverted raffinate under solvent dewaxing conditions to obtain a solvent dewaxed oil having a pour point less than about 10° C.;
   (e) catalytically dewaxing the solvent dewaxed oil under catalytic dewaxing conditions in the presence of hydrogen and a catalytic dewaxing catalyst comprising a metal hydrogenation component and a crystalline 10 or 12 ring molecular sieve to produce a catalytically dewaxed oil; and
   (f) passing the catalytically dewaxed oil to a hydrofinishing reaction zone and conducting cold hydrofinishing of the catalytically dewaxed oil in the presence of a hydrofinishing catalyst at a temperature of from 200 to 330° C., a hydrogen partial pressure of from 800 to 2000 psig, a space velocity of from 1 to 5 LHSV and hydrogen to feed ratio of from 500 to 5000 Scf/B to produce a dewaxed basestock having a viscosity index of at least about 105.

4. The process of claims 1, 2 or 3 wherein the raffinate feed has a final boiling point no greater than about 600° C.

5. The process of claims 1, 2 or 3 wherein the temperature in the hydroconversion zone is from 360 to 390° C.

6. The process of claims 1, 2 or 3 wherein the non-acidic hydroconversion catalyst is cobalt/molybdenum, nickel/molybdenum or nickel/tungsten on an alumina support.

7. The process of claims 1, 2 or 3 wherein the cold hydrofinishing is conducted at a temperature of from 230 to 300° C.

8. The process of claims 1, 2 or 3 wherein the non-acidic hydroconversion catalyst has an acidity less than about 0.5, said acidity being determined by the ability of the catalyst to convert 2-methyl-2-pentene to 3-methyl-2-pentene and 4-methyl-2-pentene and is expressed as the mole ratio of 3-methyl-2-pentene to 4-methyl-2-pentene.

9. The process of claims 1, 2 or 3 wherein the dewaxed basestock has a saturates content of at least 90 wt., a VI increase of at least 10 greater than the VI of the raffinate feed, a NOACK volatility improvement over raffinate feedstock of at least about 3 wt. at the same viscosity in the range of viscosity from 3.5 to 6.5 cSt viscosity at 100° C., a residual aromatics content sufficient to impart good solvency properties to the oil, and which passes toxicity tests as measured by the FDA(c) or IP 346 tests.

10. The process of claims 1, 2 or 3 wherein the catalytic dewaxing catalyst is a zeolite selected from ZSM-5, ZSM-11, ZSM-12, theta-1, ZSM-23, ZSM-35, ferrierite, ZSM-48, ZSM-57, beta-zeolite, mordenite and offretite.

11. The process of claims 1, 2 or 3 wherein the catalytic dewaxing catalyst is an aluminum phosphate selected from SAPO-11, SAPO-31 and SAPO-41.

12. The process of claims 1, 2 or 3 wherein the catalytic dewaxing catalyst is a composite of a crystalline molecular sieve and an amorphous component.

13. The process of claims 1, 2 or 3 wherein the catalytic dewaxing catalyst is layered catalyst containing a first layer of amorphous component and a second layer of crystalline molecular sieve.

14. The process of claims 1, 2 or 3 wherein the metal hydrogenation component of the catalytic dewaxing catalyst is at least one of a Group VIB and Group VIII metal.

15. The process of claims 2 or 3 wherein solvent dewaxing uses at least one of propane, butane, methyl ethyl ketone, methyl isobutyl ketone, benzene, toluene and xylene.

16. The process of claims 1 or 2 wherein the catalytic dewaxing step is followed by a cold hydrofinishing step.

17. The process of claims 2 or 3 wherein solvent dewaxing comprises mixing the hydrofinished raffinate with a chilled solvent to form an oil-solvent solution mixed with precipitated wax, separating precipitated wax from the oil-solvent solution, and separating the solvent from the solvent-oil solution thereby forming a solvent dewaxed oil.

\* \* \* \* \*